United States Patent
Zhang et al.

(10) Patent No.: US 12,043,132 B2
(45) Date of Patent: Jul. 23, 2024

(54) AUTOMATIC CHARGING VEHICLE AND ITS OPERATING METHOD AND AUTOMATIC CHARGING SYSTEM

(71) Applicant: Envision Energy CO., LTD, Jiangsu (CN)

(72) Inventors: Lei Zhang, Jiangsu (CN); Yang Hu, Jiangsu (CN); Dexiang Guo, Jiangsu (CN); Jianning Wang, Jiangsu (CN); Xinyu Xu, Jiangsu (CN); Di Wu, Jiangsu (CN); Hongwu She, Jiangsu (CN); Lei Li, Jiangsu (CN); Weijun Zhao, Jiangsu (CN)

(73) Assignee: Envision Energy CO., LTD, Jiangsu (CN)

( * ) Notice: Subject to any disclaimer, the term of this patent is extended or adjusted under 35 U.S.C. 154(b) by 478 days.

(21) Appl. No.: 17/429,947

(22) PCT Filed: Mar. 11, 2020

(86) PCT No.: PCT/CN2020/078735
§ 371 (c)(1),
(2) Date: Aug. 11, 2021

(87) PCT Pub. No.: WO2020/199873
PCT Pub. Date: Oct. 8, 2020

(65) Prior Publication Data
US 2022/0212555 A1    Jul. 7, 2022

(30) Foreign Application Priority Data
Apr. 3, 2019   (CN) .......................... 201910265395.0

(51) Int. Cl.
*G06F 17/00*     (2019.01)
*B60L 53/14*     (2019.01)
(Continued)

(52) U.S. Cl.
CPC ............... *B60L 53/35* (2019.02); *B60L 53/14* (2019.02); *B60L 53/305* (2019.02);
(Continued)

(58) Field of Classification Search
CPC ........ B60L 53/35; B60L 53/14; B60L 53/305; B60L 2210/30; B60L 2240/24;
(Continued)

(56) References Cited

U.S. PATENT DOCUMENTS 9,199,376 B2 * 12/2015 Wells ..................... B25J 9/1612
11,413,982 B2 *  8/2022 Goei ..................... G08G 1/202
(Continued)

FOREIGN PATENT DOCUMENTS

CN     106340912      1/2017
CN     107351694      11/2017
(Continued)

OTHER PUBLICATIONS

Portable Level 2 Generator-Powered EV Charger (Year: 2023).*
(Continued)

*Primary Examiner* — Ronnie M Mancho
(74) *Attorney, Agent, or Firm* — JCIP GLOBAL INC.

(57) ABSTRACT

An automatic charging vehicle, a method for operating the automatic charging vehicle, and an automatic charging system. The automatic charging vehicle includes: an automatic traveling module, which is configured to move, according to a route between the automatic charging vehicle and a device to be charged, to the device to be charged; a power module, which is configured to store and provide electric energy; and an automatic docking and separating device, which is configured to execute docking and separating between a first connector and a second connector capable of being in
(Continued)

electrical contact with the first connector, the first connector and the second connector being used for transmitting electric energy.

15 Claims, 8 Drawing Sheets

(51) Int. Cl.
  *B60L 53/30* (2019.01)
  *B60L 53/35* (2019.01)
  *G05D 1/00* (2006.01)
  *G06Q 30/04* (2012.01)
  *G06Q 50/06* (2012.01)
  *H02J 7/00* (2006.01)
  *H02J 7/02* (2016.01)

(52) U.S. Cl.
  CPC ......... *G05D 1/0214* (2013.01); *G05D 1/0231* (2013.01); *G05D 1/0257* (2013.01); *G06Q 30/04* (2013.01); *G06Q 50/06* (2013.01); *H02J 7/00032* (2020.01); *H02J 7/00308* (2020.01); *H02J 7/0063* (2013.01); *H02J 7/0068* (2013.01); *H02J 7/02* (2013.01); *H02J 2207/20* (2020.01)

(58) Field of Classification Search
  CPC ............ B60L 2240/32; B60L 2240/62; B60L 2240/622; B60L 2240/72; B60L 1/00; B60L 15/20; B60L 50/60; B60L 2260/32; B60L 53/20; B60L 53/36; B60L 53/50; B60L 53/66; B60L 53/665; B60L 58/12; G05D 1/0214; G05D 1/0231; G05D 1/0257; G05D 1/0212; G05D 1/0238; G06Q 30/04; G06Q 50/06; H02J 7/00032; H02J 7/00308; H02J 7/0063; H02J 7/0068; H02J 7/02; H02J 2207/20; Y02T 10/64; Y02T 10/72; Y02T 90/167; Y04S 30/14
  USPC .......................................................... 701/24
  See application file for complete search history.

(56) References Cited

U.S. PATENT DOCUMENTS

| | | | |
|---|---|---|---|
| 2014/0277742 A1* | 9/2014 | Wells .................. | B25J 9/1612 700/264 |
| 2014/0354229 A1* | 12/2014 | Zhao ..................... | B60L 53/68 320/109 |
| 2017/0163034 A1 | 6/2017 | Kumagai | |
| 2019/0155296 A1* | 5/2019 | Moore .................. | B60L 53/14 |

FOREIGN PATENT DOCUMENTS

| | | |
|---|---|---|
| CN | 109878354 | 6/2019 |
| CN | 109878355 | 6/2019 |
| CN | 110040017 | 7/2019 |
| WO | WO-2017147188 A1 * | 8/2017 |

OTHER PUBLICATIONS

Portable Level 2 Generator-Powered EV Charger (Year: 2023) (Year: 2023).*
"International Search Report (Form PCT/ISA/210) of PCT/CN2020/ 078735," mailed on May 27, 2020, with English translation thereof, pp. 1-4.
"Written Opinion of the International Searching Authority (Form PCT/ISA/237) of PCT/ CN2020/078735," mailed on May 27, 2020, pp. 1-4.

* cited by examiner

AUTOMATIC CHARGING VEHICLE AND ITS OPERATING METHOD AND AUTOMATIC CHARGING SYSTEM

CROSS-REFERENCE TO RELATED APPLICATION

This application is a 371 of international application of PCT application serial no. PCT/CN2020/078735, filed on Mar. 11, 2020, which claims the priority benefit of China application no. 201910265395.0, filed on Apr. 3, 2019. The entirety of each of the above-mentioned patent applications is hereby incorporated by reference herein and made a part of this specification.

BACKGROUND

Technical Field

The present invention relates generally to the field of electric vehicles, in particular, to an automatic charging vehicle. In addition, the present invention also relates to an operating method of the automatic charging vehicle.

Description of Related Art

Due to many advantages such as environmental protection, energy saving, light weight and national preferential policies, electric vehicles have been favored by more and more consumers in recent years. In the long run, the promotion of electric vehicles is an effective measure to reduce greenhouse gas emissions and urban environmental pollution. However, a major obstacle to the promotion of electric vehicles is the problem in charging.

In order to solve the charging problem of electric vehicles, charging piles have been set up in many parking lots. Such charging piles are non-movable fixed facilities installed in dedicated parking spaces for electric vehicles. Therefore, electric vehicles need to find such dedicated parking spaces in parking lots. With the increase of electric vehicles, the dedicated parking spaces for electric vehicles are becoming more and more inadequate, which brings inconvenience to the travel of electric vehicles. In addition, the establishment of dedicated parking spaces for electric vehicles requires a large construction cost or transformation cost, which brings greater resistance to the popularization of dedicated parking spaces.

At present, in order to solve the charging problem, a charging vehicle has appeared. Charging vehicles refer to mobile vehicles that can charge electric vehicles. One of the technical difficulties of charging vehicles is how to perform charging fully automatically. However, the limitation of the current charging vehicles is that the charging vehicles needs to be manually moved to the vicinity of the electric vehicle, and then the electric vehicle is manually connected to the charging pile. Because it does not have automatic walking and automatic docking functions, such a charging vehicle involves excessive labor costs, and the manual positioning process is time-consuming and has large errors, resulting in low charging efficiency.

SUMMARY

Starting from the prior art, the task of the present invention is to provide an automatic charging vehicle and its operating method, through which automatic walking and automatic docking can be realized, thereby charging efficiency is greatly improved and charging costs is reduced.

In the first aspect of the present invention, this task is solved by an automatic charging vehicle, which includes:
an automatic walking module, which is configured to travel to the device to be charged according to the route between the automatic charging vehicle and the device to be charged;
the power module, which is configured to store and provide electrical energy; and
an automatic docking and separation device, which is configured to perform docking and separation between a first connector and a second connector which is capable of making electrical contact with the first connector, wherein the first connector and the second connector are used for transmitting electric energy.

It should be pointed out that although the present invention is illustrated with an electric vehicle as an example, the present invention can also be applied to other fields, for example, as a reserve energy for buildings, hospitals, schools, etc., which can be supplied with energy at any time. In the present invention, electric vehicles include electric vehicles such as electric car, electric motorcycles, and electric bicycles.

In an extended solution of the present invention, it is provided that automatic charging vehicle also includes a positioning module, which is configured to determine the route between the automatic charging vehicle and the device to be charged. Through this extended solution, the route can be determined by the automatic charging vehicle itself. However, in other embodiments, the route may also be determined by a mobile application on the user equipment or a remote server.

In a preferred solution of the present invention, the automatic walking module further includes:
an automatic driving module, which is configured to determine a driving operation according to the route;
a complete vehicle chassis, which is configured to perform the driving operation; and
a lidar sensor and/or an ultrasonic radar sensor, wherein the automatic driving module determines the obstacles in the route according to the sensor signal of the lidar sensor and/or the ultrasonic radar sensor to re-determine the driving operation and/or update the route. The driving operation includes, for example, traveling, steering, braking, stopping, and so on. The route determination process is, for example, through GPS or an electronic map program, it can be calculated that the (optimal) navigation route from the current location of the automatic charging vehicle to the device to be charged, or various electronic signs, such as radio frequency tags, or the wireless signal transmission point may also be set in the parking lot, that allows the automatic charging vehicle to accurately find the corresponding parking space. The real-time update process of driving operation or route is, for example: the lidar sensor and/or ultrasonic radar sensor equipped on the mobile charging device can obtain radar images of the surroundings or on the route; then, by analyzing the radar images, it can be known whether there is on the route Obstacles, such as people, mobile or temporary obstacles, etc.; in the case of obstacles that cannot be bypassed, use GPS or electronic map programs to calculate other routes from the current location of the automatic charging vehicle to the device to be charged; or when it can be bypassed In the case of passing obstacles, determine additional or alternative driving operations such as steering and parking waiting. The obstacles that cannot be bypassed include, for example, fixed obstacles that block most roads, and the obstacles that can be bypassed include, for example, pedestrians, obstacles in movement, and so on. Through this preferred solution, real-time update of the route can be achieved, thereby obtaining better robustness and fault tolerance.

It is provided in another extended solution of the present invention that the automatic charging vehicle further includes:

a fee charging module, the fee charging module includes an electric meter, wherein the electric meter is configured to measure the electric energy provided to the device to be charged during the discharging process, and the controller is also configured to calculate the charging fee according to the rate and the electric energy; as well as a remote communication module, which is configured to remotely receive charging instructions and remotely send charging fees.

Through this extended solution, remote order placement and remote billing can be realized, thereby completely eliminating the need for manpower input. The electric meter may be, for example, a smart electric meter that measures electric energy, and the remote communication module may be, for example, a WiFi module, a Bluetooth module, a cellular communication module, and so on. The remote communication module may additionally transmit other signals, such as charging signals, discharging signals, operation completion signals, fault signals, low battery signals, and so on.

In a preferred solution of the present invention, the power module further includes:

an electric energy conversion unit, which is configured to be capable of converting AC electric energy obtained from the grid into DC electric energy and capable of converting the DC electric energy stored by the energy storage battery pack into AC electric energy or DC electric energy;

an energy storage battery pack, which is configured to be charged in a charged state and discharged in a discharged state;

a charging and discharging connection terminal, which is configured to connect to a charging power source or a device to be charged or load to be charged;

a charging switch which includes a first charging switch and a second charging switch, wherein the first charging switch is arranged in the connection route between the charging and discharging connection terminal and the input terminal of the electric energy conversion unit, and the second charging switch is arranged in the connection route between the output terminal of the electric energy conversion unit and the energy storage battery pack, the energy storage battery pack can be charged when the first charging switch and the second charging switch are closed; and a discharging switch which includes a first discharging switch and a second discharging switch, wherein the first discharging switch is arranged in the connection route between the energy storage battery pack and the input terminal of the electric energy conversion unit, and the second discharging switch is arranged in the connection route between the output terminal of the electric energy conversion unit and the charging and discharging connection terminal, the energy storage battery pack can be discharged when the first discharging switch and the second discharging switch are closed.

Through this preferred solution, there is no need to use multiple electric energy conversion units for charging and discharging operations. Instead, a single electric energy conversion unit can be used for both charging and discharging operations, which not only reduces device costs, but also reduces route costs. At the same time, it also reduces the space requirements of the charging and discharging equipment, so that the charging and discharging equipment can be developed towards low cost and compactness; in addition, only one port is required for both charging and discharging operations, thereby reducing the number of ports, reducing costs, the user operation is simplified.

It is provided in an extended solution of the present invention that the power module also includes controller, which is configured to perform the following actions:

closing the first charging switch and the second charging switch in the case of receiving a charging signal indicating that a charging operation should be performed; and closing the first discharging switch and the second discharging switch in the case of receiving a discharging signal indicating that a discharging operation should be performed.

Through this preferred solution, automated remote charging and discharging operations can be realized, thereby eliminating the need for on-site manpower input. The controller may be implemented with software, hardware, and/or firmware. The controller may also be integrated in the electric energy conversion unit. The charging signal and the discharging signal may be received through a remote communication module, for example, and a feedback signal indicating the completion of the operation is sent through the remote communication module.

In an extended solution of the present invention, the automatic charging vehicle further includes an auxiliary power supply module, which is configured to provide the automatic driving module, the fee charging module, the remote communication module, the automatic walking module, the automatic docking and separation device with electrical energy. Through this extended solution, the number of batteries can be reduced, thereby simplifying the structure of the automatic charging vehicle and reducing the space occupied.

In a preferred solution of the present invention, it is specified that the automatic docking and separation device includes:

an active device, which has an actuator, a claw and a first connector, wherein the claw is capable of extending from the active device and engaging with the passive device under the drive of the actuator when the active device is not docked with the passive device, and retracting under the drive of the actuator to make the first connector of the active device and the second connector of the passive device butt, and the claw is capable of separating the first connector of the passive device and the second connector of the active device under the drive of the actuator when the active device is docked with the passive device; and a passive device, which has a second connector that can be matched with the first connector, and the passive device is capable of engaging with the claw in a releasable manner.

In this preferred solution, the claws of the active device may be extended to lock with the passive device to realize docking, so reliable docking can be achieved without the need for accurate alignment of the plug and socket, because the claws can achieve a larger capture range and easy locking, and the claws have better flexibility and maneuverability.

In another preferred solution of the present invention, it is provided that the active device further includes a transverse motion mechanism and a longitudinal motion mechanism, wherein the transverse motion mechanism includes a transverse motion guide rail and a transverse drive synchronous belt, and the longitudinal motion mechanism includes a longitudinal motion guide rail and a longitudinal drive synchronous belt, And the actuator includes a transverse actuator and a longitudinal actuator, wherein the claws can be driven by the transverse actuator and the longitudinal actuator through the transverse drive synchronous belt and the longitudinal drive synchronous belt respectively so as to move along the transverse motion guide rail and longitudinal motion guide rail transverse mobile and longitudinally mobile respectively. In this preferred solution, the transverse and longitudinal displacement of the claws can be realized, by providing the transverse motion mechanism and a longitudinal motion mechanism, thereby providing adaptive alignment capabilities and facilitating the separation operation. It should be pointed out here that in the present invention, "transverse" and "longitudinal" are two relatively vertical directions, and do not necessarily refer to horizontal and vertical directions. For example, "transverse" refers to the direction transverse to the length of the claws, and "longitudinal" refers to the length direction of the claws.

In the second aspect of the present invention, the aforementioned task is solved by a method for operating an automatic charging vehicle according to the present invention, the method comprising:
- determining the route between the automatic charging vehicle and the device to be charged by an automatic walking module, a remote server or a mobile application on the user equipment;
- driving to the device to be charged according to the route, wherein the device to be charged is connected to the second connector;
- performing the docking between the first connector and the second connector by the automatic docking and separation device;
- charging the device to be charged by the power module; and
- performing the separation between the first connector and the second connector after the charging is completed by the automatic docking and separation device.

In an embodiment of the invention, it is provided that, the method further comprises:
- determining the obstacles in the route according to the sensor signals of the lidar sensor and/or the ultrasonic radar sensor by the automatic walking module; and
- updating the route when there is an obstacle that cannot be circumvented, and re-determining the driving operation when the obstacle can be circumvented by the automatic driving module.

Through this extended solution, adaptive route adjustment can be realized, thereby improving the robustness and fault tolerance of the system.

In a preferred solution of the present invention, it is provided that the automatic docking and separation device performing the docking between the first connector and the second connector includes:
- the claws are extended by the automatic docking and separation device;
- the claws are moved by the automatic docking and separation device so that it engages with the second connector of the passive device;
- the claws are retracted by the automatic docking and separation device; and
- the first connector is docked with the second connector by the automatic docking and separation device.

In this preferred solution, by extending the claws to lock with the passive device to realize butt, reliable docking can be achieved without the need for accurate alignment of the plug and socket, because the claws can achieve a larger capture range and easy locking, and the claws have better flexibility and maneuverability.

In an embodiment of the invention, it is provided that, the method further comprises:
- receiving the order instruction from the user by the mobile application on the user equipment;
- receiving the charging information from the automatic charging vehicle by the mobile application after the charging is completed; and
- displaying charging information to the user by the mobile application.

Through this extended solution, order placement and payment operations on mobile devices can be implemented, thereby achieving better remote automation operations.

It is provided in another extended solution of the present invention that the automatic charging vehicle further includes auxiliary power supply module, which includes:
- an input terminal, which is configured to receive input power;
- a conversion module, which is configured to convert input electrical energy;
- an absorption circuit, which is configured to absorb the energy generated by the drive motor during braking and downhill to prevent overvoltage at the output terminal of the auxiliary power supply module; and
- the output terminal, which is configured to output electric energy.

Through this preferred solution, the automatic charging vehicle or the auxiliary power supply module no longer needs to use a large-volume lead-acid battery, thereby simplifying the structure of the automatic charging vehicle and reducing the space occupied.

In the third aspect of the present invention, the aforementioned task is solved by an automatic charging system, which includes:
- automatic charging vehicles, including:
- an automatic walking module, which is configured to travel to the device to be charged according to the route between the automatic charging vehicle and the device to be charged;
- a power module, which is configured to store and provide electrical energy;
- an automatic docking and separation device, which is configured to perform docking and separation between a first connector and a second connector which is capable of making electrical contact with the first connector, wherein the first connector and the second connector are used for transmitting electric energy; as well as
- a remote communication module, which is configured to communicate with the server remotely;
- a mobile application on the user's mobile device, which is configured to perform the following actions:
- receiving user credentials from the user and send the user credentials to the server for authentication;

receiving an order instruction from the user and sending the order instruction to the server, where the order instruction includes the location of the device to be charged and the charging capacity;

receiving the charging information from the server after the charging is completed; and displaying billing information to the user; and server, which is configured to perform the following actions:

authenticating user's credentials;

sending the order instruction to the corresponding automatic charging vehicle;

determining the route between the automatic charging vehicle and the device to be charged and send the route to the automatic charging vehicle; and calculating the charging information and sending it to the mobile application after the charging is completed.

The present invention has at least the following beneficial effects: (1) through the present invention, automatic walking, automatic docking, and automatic charging can be realized, thereby greatly reducing manpower input, thereby facilitating the popularization of automatic charging vehicles, and due to cloud computing in recent years and the rise of artificial intelligence, it can be realized the precise positioning and precise automatic remote control of automatic charging vehicles; (2) by using a single electric energy conversion unit for both charging and discharging operations, it can eliminate the need for the use of multiple electric energy power conversion units for charging and discharging, which not only reduces the cost of the device, but also reduces the cost of the circuit, and at the same time reduces the space requirements of the charging and discharging equipment, so that the charging and discharging equipment can be developed in the direction of low cost and compactness. Moreover, due to this structure, the invention only needs one port to perform both charging and discharging operations, thereby reducing the number of ports, reducing the costs and simplifying user operations; (3) in the present invention, it can be realized reliable docking without the need for accurate alignment of the plug and socket through the claws of the active device extend to lock with the passive device, so as to achieve docking, because the claw can achieve a larger capture range and easy locking, and the claw has better flexibility and maneuverability.

BRIEF DESCRIPTION OF THE DRAWINGS

The invention is set forth below in more detail with reference to the detailed embodiments in conjunction with the drawings.

DETAILED DESCRIPTION OF THE INVENTION

Figure 1:
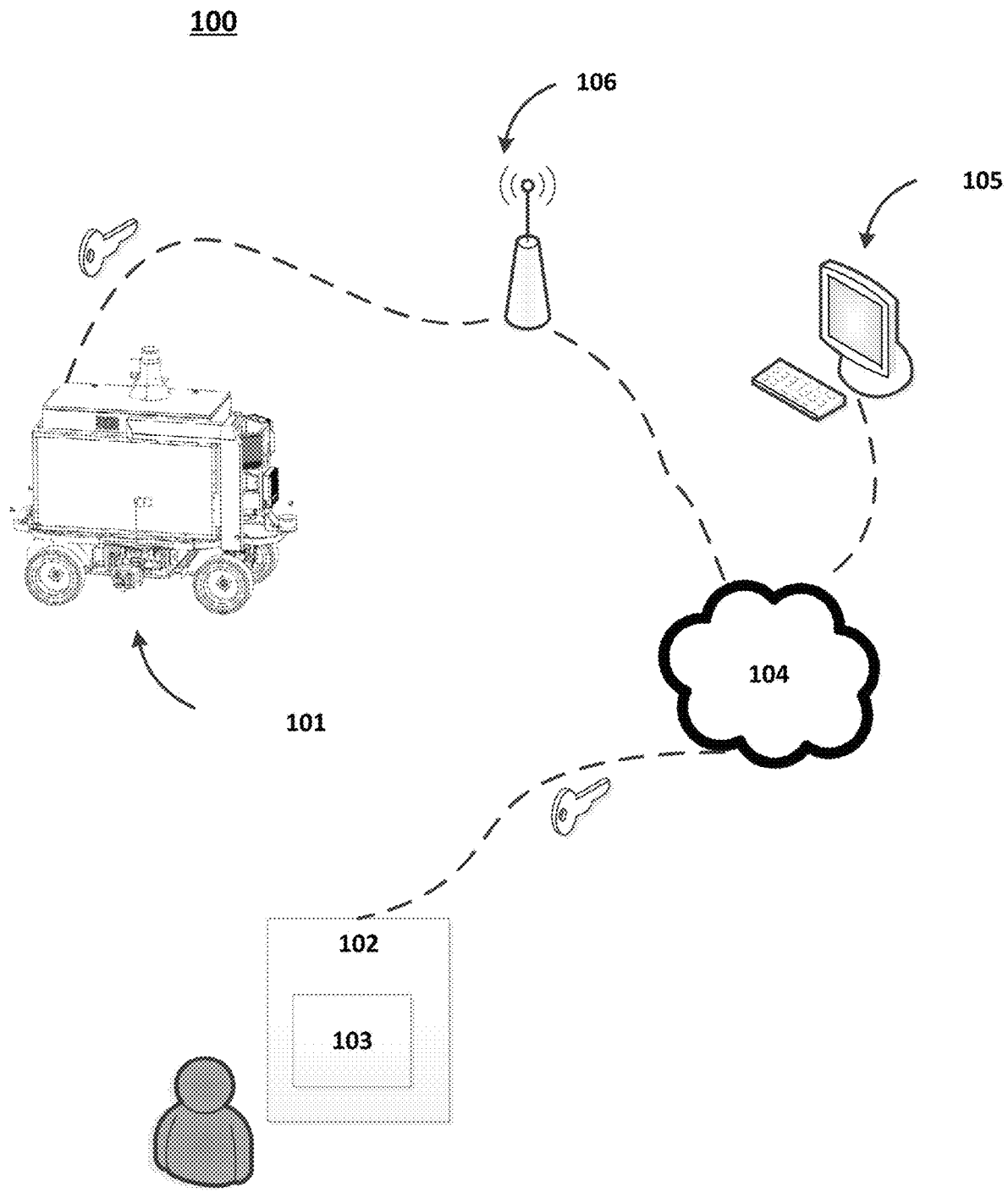
FIG. 1 shows a schematic diagram of an automatic charging system according to the present invention.

It should be pointed out that, components in the drawings may be shown in an exaggerated form for the purpose of illustration, instead of being true to scale. In the drawings, same or functionally same components are provided with same reference numerals.

In the present invention, unless otherwise specified, "arranged on", "arranged above", and "arranged above" do not exclude the presence of intermediates between the two.

In the present invention, each embodiment is only intended to illustrate the solution of the present invention, and should not be construed as limiting.

In the present invention, unless otherwise specified, the articles "a" and "an" do not exclude the scenario of multiple elements.

It should also be noted that in the embodiments of the present invention, for clarity and simplicity, only a part of the parts or components may be shown, but those of ordinary skill in the art can understand that under the teaching of the present invention, required parts or components may be added according to concrete scenarios.

It should also be noted that within the scope of the present invention, the terms "same", "equal", "equal to" and other terms do not mean that the two values are absolutely equal, but allow certain reasonable errors, that is, these terms also encompass the meanings of "substantially the same", "substantially equal", and "substantially equal to".

In addition, the numbers of the steps of methods of the present invention are not intended to limit the execution order of the method steps. Unless otherwise specified, the method steps may be performed in a different order.

It should also be pointed out that although the present invention is shown as a motor vehicle charging scene, the present invention is not limited to this, but can also be used for docking in other scene. Moreover, in the present invention, the positions of the plug and the socket can be interchanged, and other forms of connectors are also conceivable.

Finally, in the present invention, the term "sensor" should be understood to cover all sensors of a certain type of sensor. For example, a camera may include a monocular camera, a binocular camera, a depth camera, etc.; a lidar may include a single-line lidar, multiple-line lidar and so on.

FIG. 1 shows a schematic diagram of an automatic charging system according to the present invention.

As shown in FIG. 1, the automatic charging system 100 includes an automatic charging vehicle 101, a mobile application 103 on a user's mobile device 102, and a server 105. The automatic charging vehicle 101 may access the Internet 104 through a wireless access device, such as a Wi-Fi router 106, so as to communicate with the server 105. The automatic charging vehicle 101 may also communicate with the server 105 through other wireless access devices, or directly communicate with the server 105, such as through a cellular wireless connection. The user's mobile device 102 also accesses the Internet 104 to communicate with the server 105. In order to improve security, the communication between the user's mobile device 102 and the server 105 and between the automatic charging vehicle 101 and the server 105 may be encrypted communication. The user's mobile device 102 may be a mobile device such as a smart phone, a tablet computer, a laptop computer, or the like, or a fixed device such as a desktop computer. In other embodiments, the communication between the server 105, the automatic charging vehicle 101, and the user's mobile device 102 is implemented through an enterprise network, a dedicated network, a local area network, and the like.

The components of the automatic charging system 100 are described below:

the automatic charging vehicles 101, including:

An automatic walking module (not shown), which is configured to travel to the device to be charged, such as electric vehicles according to the route between the automatic charging vehicle and the device to be charged; The automatic walking module includes, for example, an automatic driving module, a vehicle chassis, a lidar sensor and/or an ultrasonic radar sensor, wherein the automatic driving module is configured to determine a driving operation according to the route, and the vehicle chassis is configured to perform the driving operation, And the automatic driving module determines the obstacles in the route according to the sensor signal of the lidar sensor and/or the ultrasonic radar sensor to re-determine the driving operation and/or update the route. The real-time update process of driving operation or route is, for example: the lidar sensor and/or ultrasonic radar sensor equipped on the mobile charging device can obtain radar images or ultrasound images of the surroundings or on the route; then, by analyzing the images, it can be known whether there is on the route Obstacles, such as people, mobile or temporary obstacles, etc.; in the case of obstacles that cannot be bypassed, use GPS or electronic map programs to calculate other routes from the current location of the automatic charging vehicle to the device to be charged; or when it can be bypassed In the case of passing obstacles, determine additional or alternative driving operations such as steering and parking waiting. The obstacles that cannot be bypassed include, for example, fixed obstacles that block most roads, and the obstacles that can be bypassed include, for example, pedestrians, obstacles in movement, and so on. The automatic driving module may include, for example, a positioning and navigation module, a path planning module, and a control execution module.

The positioning and navigation module performs positioning and navigation, for example, through the following steps a-e:
a. The positioning and navigation module uses lidar point cloud data and assists with other sensor information such as odometer during movement to determine the position and heading of the vehicle body, and create a map for real-time updates.
b. The magnetic line is preset on the ground of the garage, and the positioning and navigation module detects the travel route through magnetic sensors, and perform other environment-aware operations which is assisted by sensors such as lidar, camera, and ultrasonic radar.
c. Preset multiple wireless signal transmission points in the garage, and the positioning navigation module calculates the real-time position information of the vehicle through the geometric relationship between the fixed radio frequency tag and the mobile radio frequency tag, and perform other environment-aware operations which is assisted by sensors such as lidar, camera, ultrasonic radar, etc.
d. Preset lane line markings on the ground of the garage, the positioning and navigation module senses the position of the lane line through the camera and performs path tracking operations, the lane line markings here are not limited to lane lines on traditional highways, but should include other continuous, discrete, regular and irregular markings that can provide navigation information.
e. Preset rails in the garage, and the automatic charging vehicle move on the rails through rail racks, rollers and other devices, the rails here are not limited to rails laid on the ground, but should include other wall hangings type, hanging type guide rail that can be connected to mobile charging piles and provide movement guidance.
f. The positioning and navigation module senses surrounding environment images and point cloud data from the camera and lidar, and transmits them to the control center through wireless communication devices. The control center remotely controls the intelligent mobile charging pile to the reference position according to the received environmental information.
g. The positioning and navigation module performs positioning and navigation based on the location information provided by GPS and electronic maps, and perform other environment-aware operations which is assisted by sensors such as lidar, camera, and ultrasonic radar.

The path planning module may include, for example:
the global path decision module, which plans a passable path that avoids known obstacles and connects the starting point and the target point, based on the prior map information provided by the positioning and navigation module;
the local path decision module uses sensors such as lidar, camera, ultrasonic radar, millimeter wave radar, and infrared range finder to sense obstacles and other information on the way in real time, and perform obstacle avoidance operations, based on the passable path provided by the global path plan decision module. Obstacle avoidance operations include: decelerate, stop, modify the passable path provided by the global path plan decision module, discard the passable path provided by the global path plan decision module and re-plan a new path.

The power module, which is configured to store and provide electrical energy. With the power module of the present invention, a single electric energy conversion unit can be used to realize both charging and discharging, and a single port can be used for charging and discharging. For further details on the power module, please refer to FIG. 4 and its description.

An automatic docking and separation device, which is configured to perform docking and separation between a first connector and a second connector which is capable of making electrical contact with the first connector, wherein the first connector and the second connector are used for transmitting electric energy. The automatic docking and separation device of the present invention adopts claws to realize accurate and reliable docking and separation. For further details of the automatic docking and separation device, please refer to FIG. 3A-FIG. 3D.

A remote communication module, which is configured to communicate with the server remotely. The remote communication module may be, for example, a wireless communication module, such as a Wi-Fi module, a Blue tooth module, a ZigBee module, an infrared communication module, and so on.

An optional billing module, which is configured to bill the charges generated by the charging of the device to be charged. The billing module may include, for example, a smart meter.

A mobile application 103 on the user's mobile device 102, which is configured to perform the following actions:
receiving user credentials from the user and send the user credentials to the server for authentication or authentication. The user credentials may be, for example, a character password, voice, fingerprint, etc.

In the case of successful authentication receiving an order instruction from the user and sending the order instruction to the server 105, where the order instruction includes the location of the device to be charged and the charging capacity; the location may include, for example, a parking lot number of a parking lot or specific map location information.

Receiving the charging information from the server after the charging is completed.

Displaying charging information to the user. The charging information may be displayed on the mobile application 103, for example.

Server 105, which is configured to perform the following actions:

Authenticating user's credentials.

Sending the order instruction to the corresponding automatic charging vehicle 101. For example, the server 105 may directly send an order instruction to the automatic charging vehicle 101, or may send specific parameters, such as the charging time, the location of the device to be charged, and so on.

Determining the route between the automatic charging vehicle and the device to be charged and send the route to the automatic charging vehicle 101. The navigation route determination may be performed by a dedicated service provider, or may be calculated by the server 105. The route determination process is, for example, through GPS or an electronic map program, it can be calculated that the (optimal) navigation route from the current location of the automatic charging vehicle to the device to be charged, or various electronic signs, such as radio frequency tags, or the wireless signal transmission point may also be set in the parking lot, that allows the automatic charging vehicle 101 to accurately find the corresponding parking space by identifying the electronic signs.

Calculating the charging information and sending it to the mobile application 103 after the charging is completed. The user confirms and pays after receiving the charging information on the mobile application 103.

Figure 2:
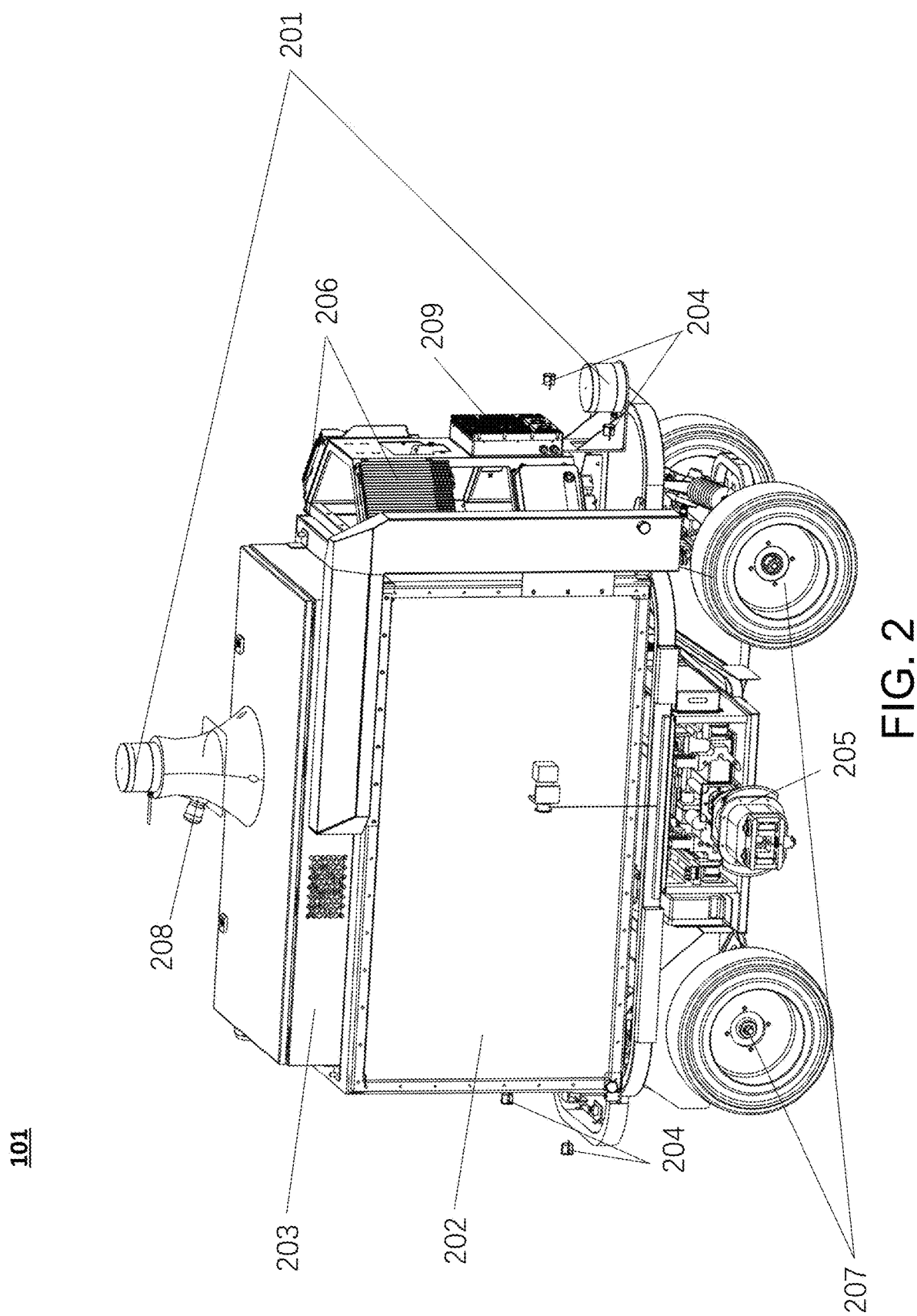
FIG. 2 shows a schematic diagram of an automatic charging vehicle according to the present invention.

FIG. 2 shows a schematic diagram of an automatic charging vehicle 101 according to the present invention.

As shown in FIG. 2, the automatic charging vehicle 101 mainly includes an automatic walking module 206, an automatic docking and separation device 205, a power module (including energy storage battery pack 202 and a charging control box 203), and a vehicle body.

The work flow of the automatic charging vehicle 101 is described below.

The user places an order in the mobile application 103, and the server 105 issues a charging instruction to the automatic charging vehicle 101 through a scheduling algorithm based on the user's order information and the information of the automatic charging vehicle 101 itself.

The main control board 209 of the automatic charging vehicle 101 receives the charging instruction, and creates a route through the automatic walking module 206 to walk to the target point, that is, the place of the device to be charged.

During the walking process, for example, two laser radars 201 and, for example eight ultrasonic radars 204 monitor the condition of road obstacles in real time, if it is found that the road ahead is blocked, the automatic walking module 206 will re-plan the route until it reaches the target point.

After reaching the target point, the automatic docking and separation device 205 automatically connects with the device to be charged, such as an electric car, after the charging control box 203 of the power module determines that the components are successfully connected, the preparation work is completed correctly, and the energy storage battery pack 202 of the power module starts to discharge to charge the device to be charged.

The charging control box 203 detects the data in the charging process, and synchronizes the data to the server 105 and/or the cloud in real time through the main control board 209, after the energy storage battery pack 202 is discharged and/or reaches the user's target power level, automatic docking and separation device 205 automatically disconnect from the electric vehicle, and wait for the main control board (9) to issue instructions, such as returning to the recovery room to recharge by the charging car 101 (in order to avoid confusion with the charging of the device to be charged, charging the charging car can also be called "Recharge"), or go to the next target point to charge the device to be charged.

When any part of the above process fails, the emergency stop device 208 can be used to stop the process.

The present invention has at least the following beneficial effects: (1) Through the present invention, automatic walking, automatic docking, and automatic charging can be realized, thereby greatly reducing manpower input, thereby facilitating the popularization of automatic charging vehicles, and due to cloud computing in recent years and the rise of artificial intelligence, it can be realized the precise positioning and precise automatic remote control of automatic charging vehicles; (2) By using a single electric energy conversion unit for both charging and discharging operations, it can eliminate the need for the use of multiple electric energy power conversion units for charging and discharging, which not only reduces the cost of the device, but also reduces the cost of the circuit, and at the same time reduces the space requirements of the charging and discharging equipment, so that the charging and discharging equipment can be developed in the direction of low cost and compactness. Moreover, due to this structure, the invention only needs one port to perform both charging and discharging operations, thereby reducing the number of ports, reducing the costs and simplifying user operations; (3) In the present invention, it can be realized reliable docking without the need for accurate alignment of the plug and socket through the claws of the active device extend to lock with the passive device, so as to achieve docking, because the claw can achieve a larger capture range and easy locking, and the claw has better flexibility and maneuverability.

Figure 3A:
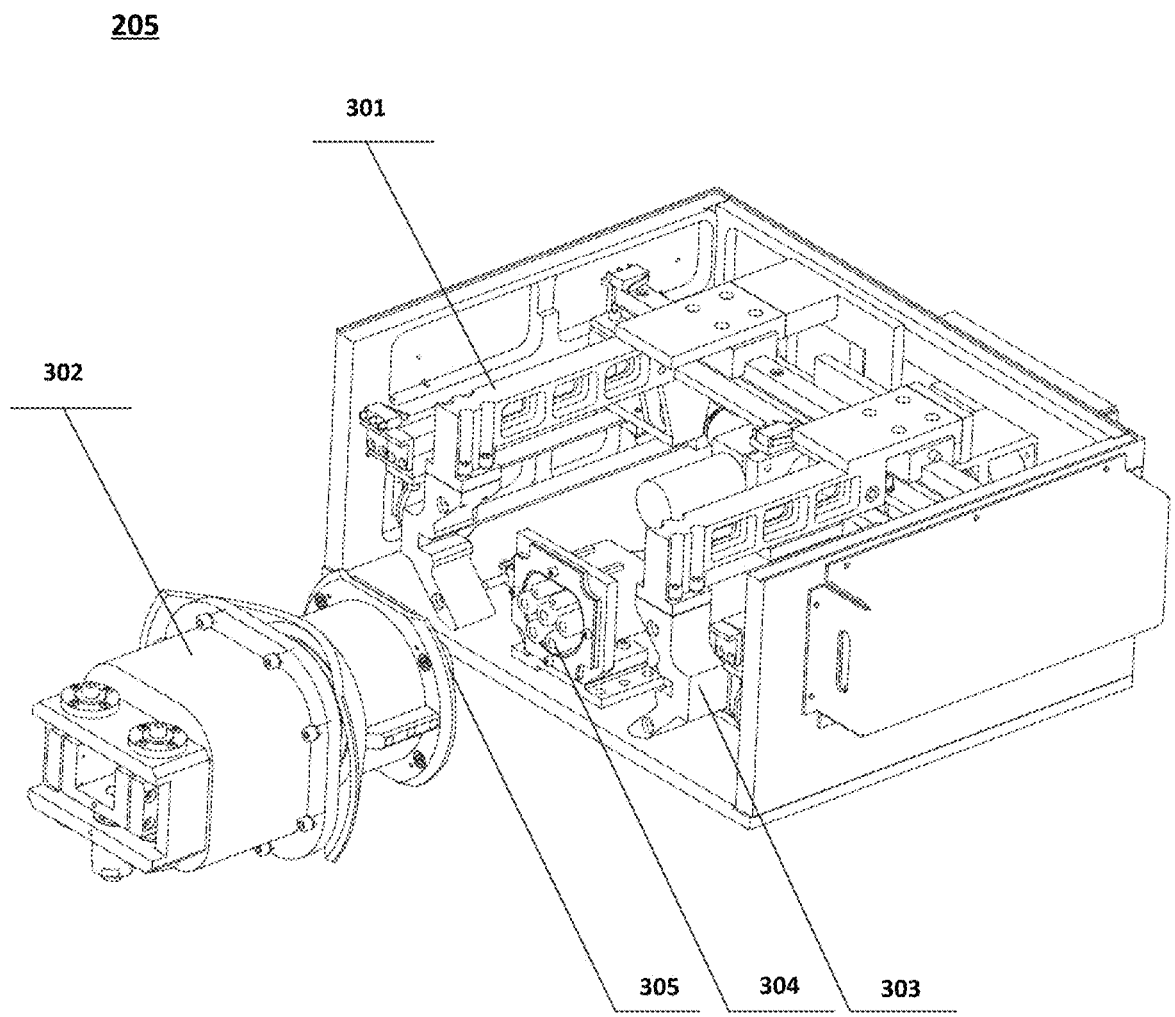
FIGS. 3A-3C show schematic diagrams of the automatic docking and separation device according to the present invention.
Figure 3B:
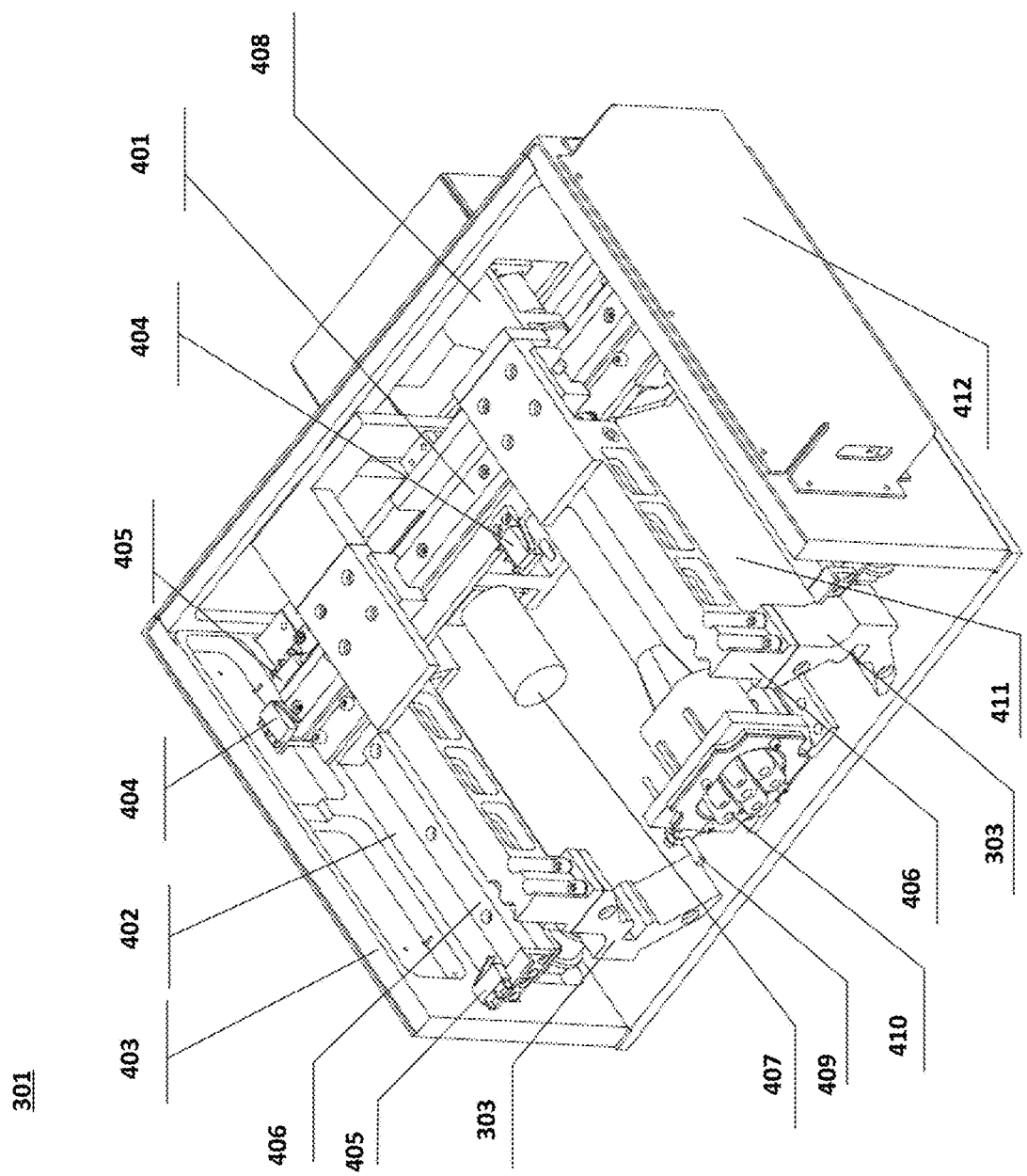
Figure 3C:
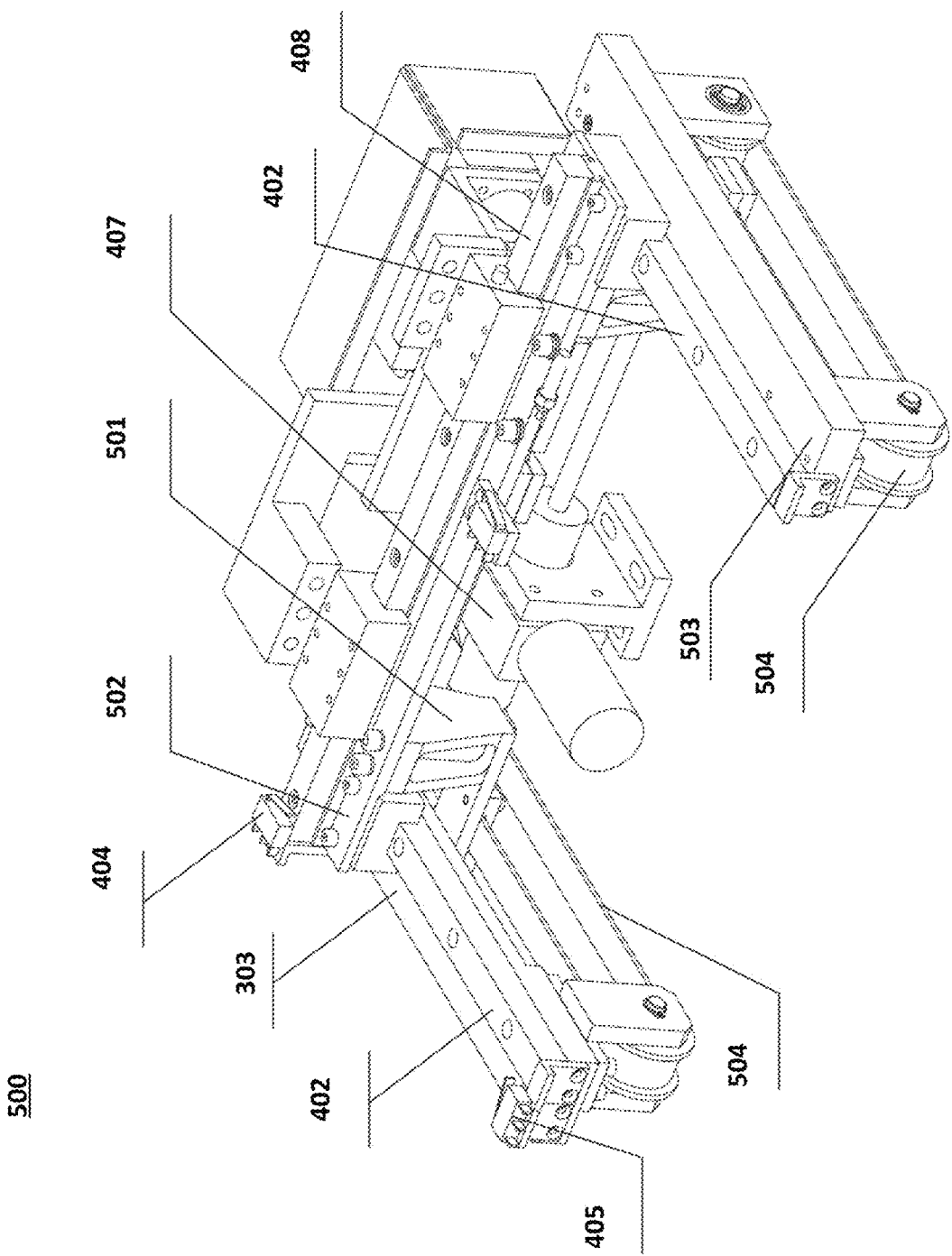
Figure 4:
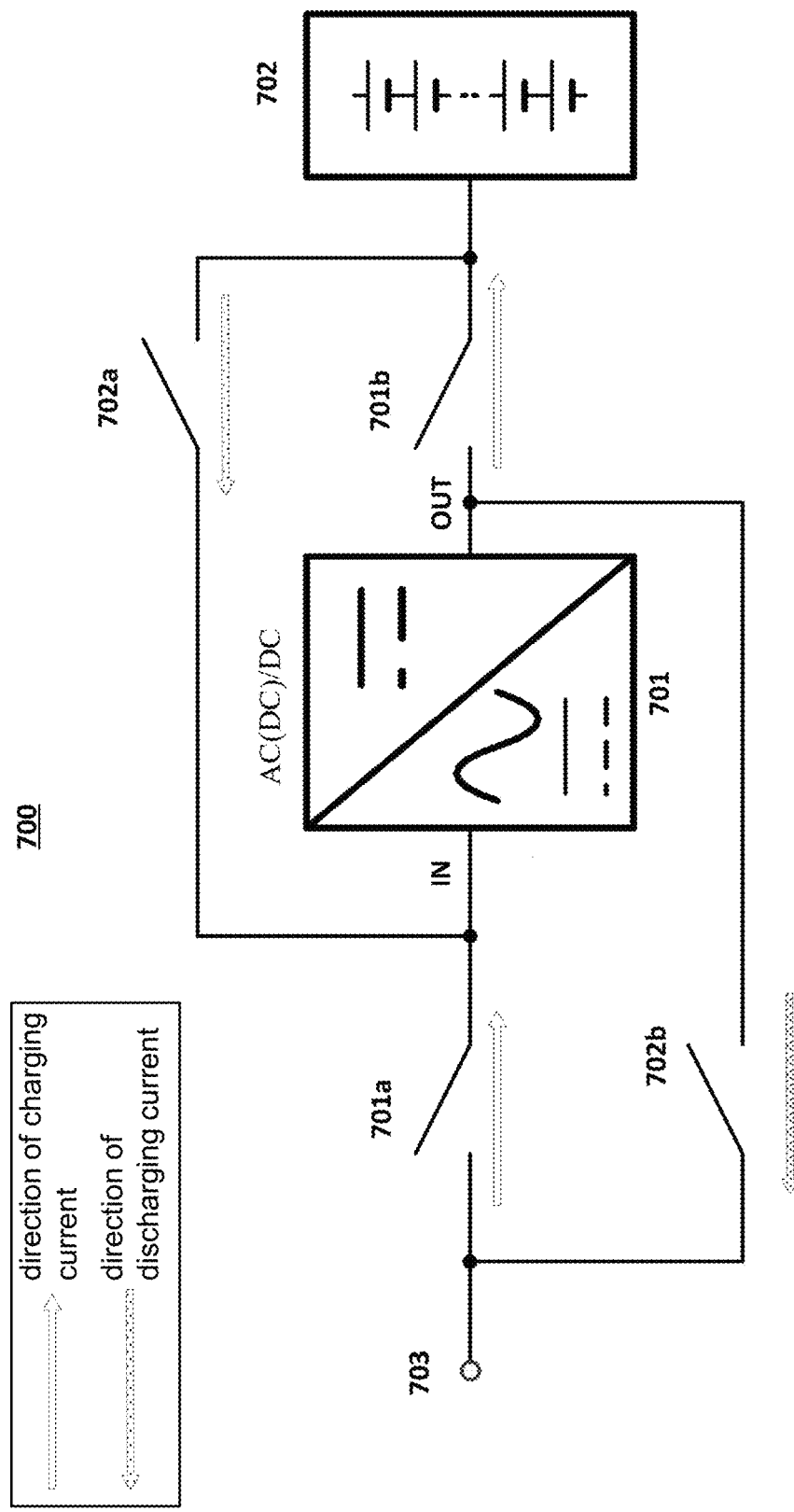
FIG. 4 shows a schematic diagram of a power module according to the present invention.

FIGS. 3A-3C show a schematic diagram of the automatic docking and separation device 205 according to the present invention, wherein FIG. 3A shows a schematic diagram of the automatic docking and separation device 205 according to the present invention, and FIG. 3B shows a schematic diagram of the active device 301 of the automatic docking and separation device 205 according to the present invention. FIG. 3C shows a schematic diagram of the actuator of the active device 301 of the automatic docking and separation device 205 according to the present invention; and FIG. 4 shows a cross-sectional view of the passive device 302 the automatic docking and separation device 205 according to the present invention.

FIG. 3A shows a schematic diagram of an automatic docking and separation device 205 according to the present invention.

As shown in FIG. 1, the automatic docking and separation device 205 includes an active device 301 and a passive device 302. The active device 301 has an actuator (not shown, see FIG. 3B for details) and a claw 303. Here, the claw 303 includes two claws for stable grasping. The claw 303 is here configured as a V-shaped concave, so as to realize automatic centering and registration when it is mated with the passive device 302. The active device 100 optionally includes a connector, such as a plug 304, and the passive device 302 has a connector that can be mated with the active device, such as a socket 305. During the docking process, the plug and the socket are connected to achieve charging, discharging and other operations. The passive device 302 may be installed at a mobile charging pile, for example, to realize the docking with the active device 301. The passive device 102 has a tolerance device for providing tolerance to the relative movement between the passive device 302 and the active device 301, for example, the connection of the ball shaft and the sleeve can realize three tolerances about the pitching movement and the deflection aeronautical motion and small-angle rolling motion of the socket of the passive device 302; the forward and backward motion tolerance design of the socket is realized through the thrust spring; the up and down motion tolerance design of the plug is realized through the jacking spring.

The electronic components is installed through the plastic box on the back of the movable charging pile to realize temperature alarm and control, and the passive device is installed with the movable charging pile through the screw hole of the center disc to realize the mobility of the passive device, and the charging cable is installed through the surrounding trunking.

The process of docking and separation is as follows: the claws 303 extends from the active device 301 and engages with the passive device 302 under the drive of the actuator when the active device 301 is not docked with the passive device 302, and retracting under the drive of the actuator to make the active device 301 and the the passive device 302 butt, and the claws 303 is capable of separating the passive device 302 and the active device 301 under the drive of the actuator when the active device 301 is docked with the passive device 302' such as pushing away or pulling away or disconnecting. Here, "engage" refers to mechanical contact and locking, so that the claws 303 can be relatively fixed with the passive device when the active device is retracted, and the locking can be released when separated. The driving process of the actuator is, for example, as follows: First, the two claws 303 move laterally (that is, transverse to their length) to both sides to open, so that the space between the two claws 303 can accommodate the passive device 302 or its socket 305, and then move longitudinally (that is, in its length direction) to surround the passive device 302 or its socket 305, and the last two claws 303 move laterally inward to lock with the passive device 302 or its socket 305. The movement range of the claws 303 can be set to be relatively large, so as to achieve reliable docking even when the active device 301 and the passive device 302 are greatly misaligned. It should be pointed out here that the number of claws 303 is only exemplary, and in other embodiments, other numbers of claws, such as one or three claws, can be provided.

FIG. 3B shows a schematic diagram of the active device 301 of the automatic docking and separation device according to the present invention.

The active device 301 is a mobile device that actively connects with the passive device 302. In the present invention, the active device 301 can maximize the realization of large-scale capture and docking in an extremely limited space (such as 380 mm*293 mm*165 mm), and can achieve capture and docking in a certain horizontal range centered on the plug (such as ±93 mm).

As shown in FIG. 3B, the active device 301 includes the following components (some of which are optional):

a housing 403, which is configured to accommodate the components of the active device 401. The housing 403 may be made of hard materials, such as plastic or metal, to provide a certain strength.

Claws 303, which is configured with two claws 303 to achieve a more stable docking. The claws 303 has a support arm 406 connected to its end. The support arm 406 is used to carry the concave head of the claw 403 for locking. The concave head of the claw 403 is connected to the transverse motion guide rail 401 and the longitudinal motion guide rail 402 through a support arm to realize the transverse and longitudinal movement of the claw 403.

The movement mechanism includes a transverse motion mechanism and a longitudinal motion mechanism, wherein the transverse movement mechanism includes a transverse motion guide rail 401 and a transverse drive device 408, and the longitudinal movement mechanism includes a longitudinal motion guide rail 402 and a longitudinal drive device 407. The driving device may be a motor, such as a stepper motor. The transverse and longitudinal motion guide rails 401 and 402 are respectively arranged in pairs to provide guidance for the two claws 303. The transverse drive device 408 and the longitudinal drive device 407 drive the claws to move transverse and longitudinally by transverse drive synchronous belt and longitudinally drive synchronous belt (not shown), respectively. The movement mechanism is optionally equipped with a transverse movement travel switch 404 and a longitudinal movement travel switch 405 for limiting the range of transverse and longitudinal movement. The transverse movement travel switch 404 and the longitudinal movement travel switch 405 are, for example, provided in pairs at the ends or somewhere in the middle of the corresponding rails. As the trigger point of the signal, the travel switch controls the travel in all directions, protects the safe operation of the system, and avoids damage of the structural parts caused by the motor speeding.

Plug 410, which is configured to be able to interface with the socket of the passive device. The plug 410 is arranged centrally between the two claws 303, for example. The plug 410 optionally has a docking detector 409 for detecting whether the plug and the socket are successfully docked. The docking detector 409 may be a magnetic sensor, a proximity sensor, a Hall sensor, a pressure sensor, etc., where the sensor provides a corresponding signal after the plug is successfully docked with the socket.

The controller 411, which is, for example, configured to position the active device 301 so that the active device 301 and the passive device 302 are roughly aligned. The positioning process can be implemented through GPS signals, image processing, and ranging, for example. In addition, the controller 411 may optionally perform operations such as abnormal situation processing, remote reception and processing of docking or disconnection signals, user authentication, and charging.

A power supply 412, which, for example, includes a plurality of rechargeable batteries or accumulators. The power supply 412 is configured to charge the docked motor vehicle, or alternatively may also supply power to the components of the active device 301 and/or the passive device 302, especially the driving device. The power supply 412 is optional here. On the contrary, the automatic docking and separation device 205 can also be powered by the power module of the automatic charging vehicle 101.

FIG. 3B shows a schematic diagram of the actuator 500 of the active device 301 of the automatic docking and separation device according to the present invention.

The actuator 500 is used to provide the transverse and longitudinal movement capabilities of the claw 303. The transverse movement is driven by a motor to rotate the transverse drive synchronous belt. The relative movement between the upper and lower layers of the transverse drive synchronous belt is used to drive the support arm and the claw to move to realize the clamping and opening of the claws which is realized automatically center the center; the longitudinal movement can realize the extension and retraction of the claws, and provide power for the docking and separation of the plug and the socket.

The components of the actuator 500 are described below (some of them are optional):

Longitudinal motion mechanism, which includes a longitudinal motion guide rails 402, a longitudinal movement travel switch 405, a longitudinal drive device 407, a longitudinal drive synchronous belt 504, and a guide rail bracket 503. The longitudinal motion mechanism is used to provide the claws 303 with a longitudinal movement capability, that is, parallel to the length of the claws. To this end, the longitudinal driving device 407, such as a motor, drives the longitudinal drive synchronous belt 504 to rotate, and the longitudinal drive synchronous belt 504 in turn drives the claws 303 to move along the longitudinal motion guide rails 402. The longitudinal movement travel switch 405 is arranged at a corresponding position (such as an end or somewhere in the middle) on the longitudinal motion guide rails 402 to limit the range of the longitudinal displacement. The guide rail bracket 503 is used to support the longitudinal motion guide rails 402.

A transverse movement mechanism, which includes a transverse motion guide rail 408, a transverse drive synchronous belt (not shown), a transverse movement travel switch 404, a transverse movement guide rail mounting plate 502, and a transverse drive device (not shown). The transverse movement mechanism is used to provide the claws 303 with a transverse movement capability, that is, transverse (for example, perpendicular to) the length direction of the claws. To this end, a transverse driving device, such as a motor, drives the synchronous belt to rotate, and the synchronous belt drives the claws 303 to move along the transverse movement guide rail 408. The transverse movement travel switch 405 is arranged at a corresponding position (such as an end or somewhere in the middle) on the transverse motion guide rails 408 to limit the range of the transverse displacement. The transverse movement guide rail mounting plate 502 is used to support the transverse motion guide rail 408.

Figure 3D:
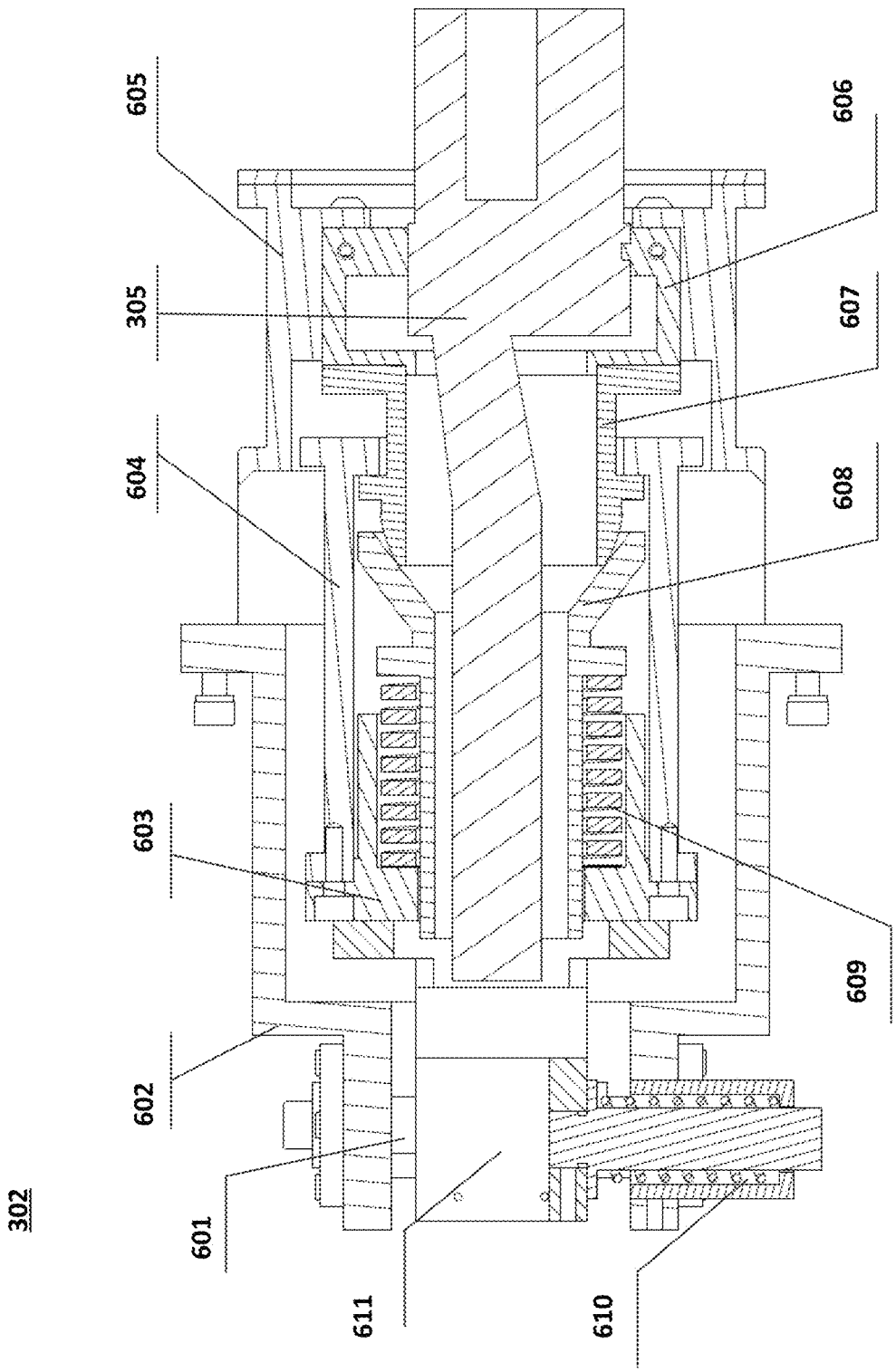
FIG. 3D shows a cross-sectional view of the passive device of the automatic docking and separation device according to the present invention.

FIG. 3D shows a cross-sectional view of the passive device 302 the automatic docking and separation device according to the present invention.

The passive device 302 adopts a multi joint flexible design scheme, which can increase tolerance to tolerances and reduce the complexity of the structure. In the present invention, the socket 305 has 5 degrees of freedom, which are:

(1) (2) The socket 305 performs pitching movement (i.e. up and down movement in the figure) and deflection aeronautical movement (i.e. movement in the direction perpendicular to the figure) between the ball shaft 607 and the limit sleeve 604;

(3) The socket 305 rolls in a small angle around its central axis;

(4) Utilize the elastic expansion and contraction of the thrust spring 609 to realize the forward and backward movement of the socket 305;

(5) Using the elastic expansion and contraction of the jacking spring 610, the up and down movement of the socket 305 is realized.

By setting these degrees of freedom, a highly adaptive docking between the plug and the socket can be realized, and the structure is simple, and the processing cost is greatly reduced.

The components of the passive device 302 are described below (some components are optional):

The socket 305 is used to connect with the plug of the active device 301 to transmit electric energy, such as charging and discharging. Other forms of connectors are also conceivable. In addition, the active device 301 may also use a socket, and the passive device 302 may use a plug. The socket 305 is fixed by a plug fixing seat 606, wherein the two are fixed to each other by, for example, a shape fit, and the plug fixing seat 606 is fixedly connected to the guide tube 605 by a fixing member, such as a screw or a nut.

Tolerance device, which is used to provide multiple degrees of freedom for the socket 305. The tolerance device includes the following components. The ball shaft 607 is sleeved on the socket 305 so as to provide the socket 305 with certain mobility. The opening of the ball shaft 607 may have a certain size in the horizontal and vertical directions, for example, to provide a restriction on the movement of the socket 305. The bell mouth 608 contacts or engages with the ball shaft 607. The bell mouth 608 has a horn-like or conical shape for receiving the thrust of the socket 305 to achieve forward and backward movement, wherein the bell mouth 605 has a protrusion for pushing the thrust spring 609. The other end of the thrust spring 609 abuts on the thrust spring guide seat 603 to provide a reaction force to the elastic force of the thrust spring 609. The thrust spring guide seat 603 contacts or engages with the guide assembly fixing seat 611 to realize the fixation of each guide assembly. The guide assembly fixing seat 611 is in contact with the jacking spring 610 in the vertical direction so as to push the jacking spring 610 to realize the up and down movement in the direction of the guide assembly 301. The other end of the jacking spring 610 may be in contact with the end of the corresponding component to provide a reaction force of the elastic force. The limit sleeve 604 is sleeved on and fixed to a part of the ball shaft 607, the bell mouth 608, and the thrust spring guide seat 603, so as to provide a fixing part and a receiving part for these components.

Installation and support assembly is used to provide installation capacity and support. The external mounting base 602 is arranged on the outside to provide external mounting capability. The tooling bracket 612 is arranged at the lower part of the passive device 302 to support various components of the passive device 302. The sliding feet 612 on the tooling bracket 612 are used to provide the mobility of the passive device 302. The claw 303 of the active device 301 is extended to lock with the passive device, so as to realize the docking, and the reliable docking can be realized without the need of accurate alignment of the plug and the socket, because the claw 303 can achieve a larger capture range and easy to lock (for example, capture and lock or unlock the passive device by transverse and longitudinal movement); the passive device 302 of the automatic docking and separation device 205 of the present invention has multiple degrees of freedom, which can realize multiple tolerance in the direction, thereby facilitating smooth docking; in the present invention, the claws 302 adopts a concave structure, which can be easily locked in place with the passive device 302 and can be easily unlocked without additional adjustment steps, thereby achieving reliable docking and separation.

FIG. 4 shows a schematic diagram of a power module 700 according to the present invention. The power module 700 may be configured to charge a device to be charged, such as an electric vehicle. In one embodiment, the power module 700 includes one or more large-capacity batteries to charge the electric vehicle.

As shown in FIG. 4, the power module 700 includes the following components:

An electric energy conversion unit 701, which is configured to be capable of converting AC electric energy obtained from the grid into DC electric energy and capable of converting the DC electric energy stored by the energy storage battery pack 702 into AC electric energy or DC electric energy. The electric energy conversion unit 701 has, for example, an AC/DC converter (such as a three-phase AC/DC converter) and a DC/AC or DC/DC converter.

An energy storage battery pack 702, which is configured to be charged in a charged state and discharged in a discharged state. The energy storage battery pack 702 may include a single battery or multiple batteries. In the case of multiple batteries, the batteries may be connected in series or in parallel. The energy storage battery pack 702 may be, for example, a storage battery or a lithium ion battery.

A charging and discharging connection terminal 703, which is configured to connect to a charging power source or a device to be charged or load to be charged. The charging power source or the device to be charged may be, for example, a charging power source, such as a power grid, a storage battery, and the like. The load can be various electrical appliances, such as mobile devices or electrical appliances.

The charging switch includes a first charging switch 701a and a second charging switch 701b, wherein the first charging switch 701a is arranged in the connection route between the charging and discharging connection terminal 703 and the input terminal IN of the electric energy conversion unit, and the second charging switch 701b is arranged in the connection route between the output terminal OUT of the electric energy conversion unit and the energy storage battery pack 702, the energy storage battery pack 702 can be charged by for example the grid connected to the charging connection 703 when the first charging switch 701a and the second charging switch 701b are closed (See direction of charging current).

The discharging switch includes a first discharging switch 702a and a second discharging switch 702b, wherein the first discharging switch 702a is arranged in the connection route between the energy storage battery pack 702 and the input terminal IN of the electric energy conversion unit, and the second discharging switch 702b is arranged in the connection route between the output terminal OUT of the electric energy conversion unit and the charging and discharging connection terminal 703, the energy storage battery pack 702 can be discharged when the first discharging switch 702a and the second discharging switch 702b are closed, for example, to charge the battery connected to the charging and discharging connection terminal 703 or to supply power to the load connected to it. The first charging switch 701a, the second charging switch 701b, the first discharging switch 702a, and the second discharging switch 702b are contactors, such as relays, thereby realizing the on-off of electronic switches.

The working process of the power module 700 of the present invention is described below.

Charging process: the first charging switch 701a and the second charging switch 701b are closed manually or under the control of the controller, and the alternating current or direct current enters the electric energy conversion unit 701 from the alternating current grid or other power source, and is converted into a suitable current and voltage for the charging of the energy storage battery pack 702.

Discharge process: the second discharge switch 702a and the second discharge switch 702b are closed manually or under the control of the controller, the current energy storage battery pack 702 enters the electric energy conversion unit 701, and is converted into suitable for the power supply of electric load connecting to the charging and discharging connection terminal 703, or converted into suitable for the changing of battery, or converted into suitable for feeding to the AC power grid to supply power to the power grid.

Through this power module 700, there is no need to use multiple electric energy conversion units for charging and discharging operations. Instead, a single electric energy conversion unit 701 can be used for both charging and discharging operations, which not only reduces device costs, but also reduces route costs. At the same time, it also reduces the space requirements of the charging and discharging equipment, so that the charging and discharging equipment can be developed towards low cost and compactness; in addition, only one port is required for both charging and discharging operations, thereby reducing the number of ports, reducing costs, The user operation is simplified.

Figure 5:
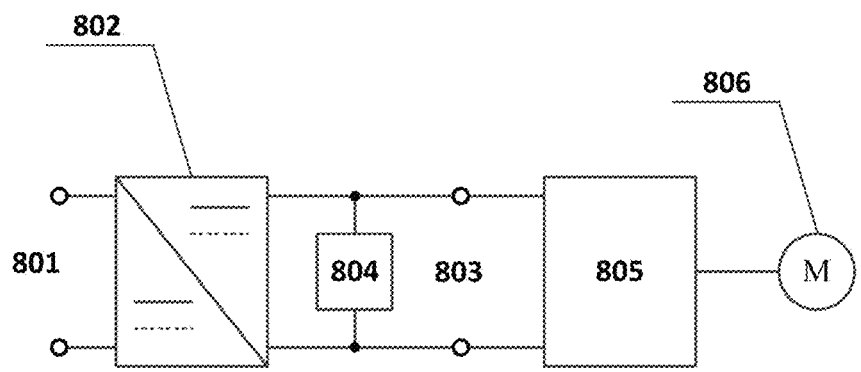
FIG. 5 shows a schematic diagram of an auxiliary power supply module according to the present invention.

FIG. 5 shows a schematic diagram of an auxiliary power supply module 800 according to the present invention. The auxiliary power module 800 includes an input terminal 801, a conversion module 802, an output terminal 803, and an absorption circuit 804. The auxiliary power supply module 800 can be powered by an energy storage battery pack via the input terminal 801, for example, and the low-voltage DC power (for example, 48V) output by the auxiliary power supply module 800 supply power for automatic driving module, a billing module, a remote communication automatic walking modules and/or automatic docking and separation devices via an output terminal 803. The automatic walking module includes at least one motor driver 805 and at least one driving motor 806. the absorption circuit 804 is configured to absorb the energy generated by the drive motor during braking and/or downhill to prevent overvoltage at the output terminal of the auxiliary power supply module. The overvoltage absorption module 804 can use a DC chopper circuit, or other active/passive overvoltage protection devices. Through this preferred solution, the automatic charging vehicle or the auxiliary power supply module 800 no longer needs to use a large-volume lead-acid battery, thereby simplifying the structure of the automatic charging vehicle and reducing the space occupied.

Although some embodiments of the invention are described in the present application document, those skilled in the art may understand that these embodiments are shown merely as examples. Under the teachings of the invention, various variations, alternatives and modifications are conceivable to those skilled in the art. The appended claims are intended to define the scope of the invention and hereby encompass the claims themselves and equivalent methods and structures.

What is claimed is:

1. An automatic charging vehicle, comprising:
   an automatic walking module, which is configured to travel to a device to be charged according to a route between the automatic charging vehicle and the device to be charged;
   a power module, which is configured to store and provide electrical energy;
   an automatic docking and separation device, which is configured to perform docking and separation between a first connector and a second connector which is capable of making electrical contact with the first connector, wherein the first connector and the second connector are configured to transmit electric energy; and
   an auxiliary power supply module, which comprises:
   a power conversion module, which is configured to convert electric energy of an energy storage battery pack to supply power to the automatic walking module, the automatic docking and separation device, an automatic driving module, a fee charging module, and/or a remote communication module; and
   an overvoltage absorption module, which is configured to absorb energy generated by the automatic charging vehicle during braking and downhill to prevent overvoltage at an output terminal of the automatic charging vehicle.

2. The automatic charging vehicle according to claim 1, the automatic charging vehicle further comprises a positioning module, which is configured to determine the route between the automatic charging vehicle and the device to be charged.

3. The automatic charging vehicle according to claim 1, wherein the power module comprises:
   an automatic driving module, which is configured to determine a driving operation according to the route;
   a complete vehicle chassis, which is configured to perform the driving operation; and
   a lidar sensor and/or an ultrasonic radar sensor, wherein the automatic driving module determines obstacles in the route according to a sensor signal of the lidar sensor and/or the ultrasonic radar sensor to re-determine the driving operation and/or update the route.

4. The automatic charging vehicle according to claim 3, wherein the automatic driving module comprises:
   a positioning navigation module, which is configured to determine a location of the automatic charging vehicle and a location of the device to be charged;
   a path planning module, which is configured to determine a route from the automatic charging vehicle to the device to be charged according to the location of the automatic charging vehicle and the location of the device to be charged; and
   a control execution module, which is configured to generate control instructions, and the control instructions are configured to control the automatic charging vehicle to travel along the route.

5. The automatic charging vehicle according to claim 1, further comprising:
   the fee charging module, the fee charging module comprises an electric meter, wherein the electric meter is configured to measure electric energy provided to the device to be charged during the discharging process, and the controller is also configured to calculate the charging fee according to rate and electric energy; and
   the remote communication module, which is configured to remotely receive charging instructions and remotely send charging fees.

6. The automatic charging vehicle according to claim 1, wherein the power module comprises:
   an electric energy conversion unit, which is configured to be capable of converting AC electric energy obtained from a grid into DC electric energy and capable of converting DC electric energy stored in an energy storage battery pack into AC electric energy or DC electric energy;
   the energy storage battery pack, which is configured to be charged in a charged state and discharged in a discharged state;
   a charging and discharging connection terminal, which is configured to connect to a charging power source or a device to be charged or load to be charged;
   a charging switch, which comprises a first charging switch and a second charging switch, wherein the first charging switch is arranged in a connection route between the charging and discharging connection terminal and an input terminal of the electric energy conversion unit, and the second charging switch is arranged in a connection route between an output terminal of the electric energy conversion unit and the energy storage battery pack, wherein the energy storage battery pack may be charged when the first charging switch and the second charging switch are closed; and
   a discharging switch, which comprises a first discharging switch and a second discharging switch, wherein the first discharging switch is arranged in a connection route between the energy storage battery pack and the input terminal of the electric energy conversion unit, and the second discharging switch is arranged in a connection route between the output terminal of the electric energy conversion unit and the charging and discharging connection terminal, wherein the energy storage battery pack may be discharged when the first discharging switch and the second discharging switch are closed.

7. The automatic charging vehicle according to claim 6, wherein the power module further comprises a controller, which is configured to perform following actions:
   closing the first charging switch and the second charging switch in a case of receiving a charging signal indicating that a charging operation should be performed; and
   closing the first discharging switch and the second discharging switch in a case of receiving a discharging signal indicating that a discharging operation should be performed.

8. The automatic charging vehicle according to claim 1, wherein the automatic docking and separation device comprises:
   an active device, which has an actuator, a claw and a first connector, wherein the claw is capable of extending from the active device and engaging with a passive device when driven by the actuator if the active device is not docked with the passive device, and capable of retracting when driven by the actuator to make the first connector of the active device and a second connector of the passive device dock with each other, and the claw is capable of separating a first connector of the passive device and a second connector of the active device when driven by the actuator if the active device is docked with the passive device; and the passive device, which has the second connector that may be matched with the first connector, and the passive device is capable of engaging with the claw in a releasable manner.

9. The automatic charging vehicle according to claim 8, the active device further comprises a transverse motion mechanism and a longitudinal motion mechanism, wherein the transverse motion mechanism comprises a transverse motion guide rail and a transverse drive synchronous belt, and the longitudinal motion mechanism comprises a longitudinal motion guide rail and a longitudinal drive synchronous belt, and the actuator comprises a transverse actuator and a longitudinal actuator, wherein the claws may be driven by the transverse actuator and the longitudinal actuator through the transverse drive synchronous belt and the longitudinal drive synchronous belt respectively so as to move transversely and longitudinally respectively along the transverse motion guide rail and longitudinal motion guide rail.

10. The automatic charging vehicle according to claim 1, which wherein the auxiliary power supply module comprises:

an input terminal, which is configured to receive input power;

a conversion module, which is configured to convert input electrical energy;

an absorption circuit, which is configured to absorb energy generated by a drive motor during braking and/or downhill to prevent overvoltage at an output terminal of the auxiliary power supply module; and the output terminal, which is configured to output electric energy.

11. A method for operating the automatic charging vehicle according to claim 1, comprising:

determining, by a remote server, the route between the automatic charging vehicle and the device to be charged;

driving to the device to be charged according to the route, wherein the device to be charged is electrically connected to the second connector;

performing the docking between the first connector and the second connector by the automatic docking and separation device;

charging the device to be charged by the power module; and performing the separation between the first connector and the second connector after the charging is completed by the automatic docking and separation device.

12. The method according to claim 11, further comprising:

determining, by the automatic walking module, obstacles in the route according to sensor signals of a lidar sensor and/or an ultrasonic radar sensor; and updating the route when there is an obstacle that cannot be bypassed, and re-determining a driving operation when the obstacle can be bypassed.

13. The method according to claim 11, wherein performing the docking between the first connector and the second connector by the automatic docking and separation device comprises:

extending claws by the automatic docking and separation device;

moving the claws by the automatic docking and separation device so that it engages with the second connector of a passive device;

retracting the claws by the automatic docking and separation device; and docking the first connector with the second connector by the automatic docking and separation device.

14. The method according to claim 11, further comprising:

receiving an order instruction from a user by a mobile application on a user equipment;

receiving a charging information from the automatic charging vehicle by the mobile application after the charging is completed; and displaying charging information to the user by the mobile application.

15. An automatic charging system, comprising:

an automatic charging vehicle, including:

an automatic walking module, which is configured to travel to a device to be charged according to a route between the automatic charging vehicle and the device to be charged;

a power module, which is configured to store and provide electrical energy;

an automatic docking and separation device, which is configured to perform docking and separation between a first connector and a second connector which is capable of making electrical contact with the first connector, wherein the first connector and the second connector are configured to transmit electric energy;

a remote communication module, which is configured to communicate with a server remotely; and an auxiliary power supply module, which comprises:

a power conversion module, which is configured to convert electric energy of an energy storage battery pack to supply power to the automatic walking module, the automatic docking and separation device, an automatic driving module, a fee charging module, and/or a remote communication module; and an overvoltage absorption module, which is configured to absorb energy generated by the automatic charging vehicle during braking and downhill to prevent overvoltage at an output terminal of the automatic charging vehicle;

a mobile application on a mobile device of a user, which is configured to perform following actions:

receiving user credentials from the user and send the user credentials to the server for authentication;

receiving an order instruction from the user and sending the order instruction to the server, wherein the order instruction comprises a location of the device to be charged and a charging capacity;

receiving a charging information from the server after the charging is completed; and displaying billing information to the user; and the server, which is configured to perform following actions:

authenticating the user credentials;

sending the order instruction to corresponding automatic charging vehicle;

determining the route between the automatic charging vehicle and the device to be charged and sending the route to the automatic charging vehicle; and calculating the charging information and sending it to the mobile application after the charging is completed.

\* \* \* \* \*